US008767769B2

(12) United States Patent
Nistor et al.

(10) Patent No.: US 8,767,769 B2
(45) Date of Patent: Jul. 1, 2014

(54) PROCESSING DATA FLOWS

(75) Inventors: Adrian Ioan Nistor, Bucharest (RO);
Randall J Brace, Wheeling, IL (US);
Alexandru Sorin Muntean, Sibiu (RO)

(73) Assignee: Freescale Semiconductor, Austin, TX (US)

( * ) Notice: Subject to any disclaimer, the term of this patent is extended or adjusted under 35 U.S.C. 154(b) by 317 days.

(21) Appl. No.: 13/143,550

(22) PCT Filed: Feb. 23, 2009

(86) PCT No.: PCT/IB2009/050723
§ 371 (c)(1),
(2), (4) Date: Jul. 7, 2011

(87) PCT Pub. No.: WO2010/095005
PCT Pub. Date: Aug. 26, 2010

(65) Prior Publication Data
US 2012/0134293 A1 May 31, 2012

(51) Int. Cl.
H04J 3/00 (2006.01)
H04L 1/00 (2006.01)
H04L 27/00 (2006.01)
H04L 25/02 (2006.01)

(52) U.S. Cl.
CPC ............ *H04L 1/0038* (2013.01); *H04L 1/0046* (2013.01); *H04L 27/0012* (2013.01); *H04L 25/0262* (2013.01)
USPC ............................ 370/464; 375/340; 375/316

(58) Field of Classification Search
CPC . H04L 1/0038; H04L 1/0046; H04L 27/0012; H04L 25/0262
See application file for complete search history.

(56) References Cited

U.S. PATENT DOCUMENTS 6,765,887 B1 * 7/2004 Shiu et al. ..................... 370/329
6,813,736 B2 11/2004 Wang et al.
(Continued)

FOREIGN PATENT DOCUMENTS

JP 2008-160260 A 7/2008
JP 2008160260 A 7/2008
WO 2001-024465 A1 4/2001

OTHER PUBLICATIONS

International Search Report and Written Opinion correlating to PCT/IB2009/050723 dated Nov. 18, 2009.

*Primary Examiner* — Kibrom T Hailu
*Assistant Examiner* — James P Duffy

(57) ABSTRACT

A system for processing data flows comprises a classifier, a first processor, a first checking unit, a calculator, and a second processor. The classifier is designed for classifying of data channels into a first and a second class of data channels. The first processor is designed for processing of a second subclass of data channels. The calculator is designed for calculating information for the second class data channels from processing results of the first processor. The second processor is designed for processing the second class data channels using information calculated by the calculator. Each of network equipment for an uplink connection, and of user equipment for a downlink connection or batch processing of format detection comprises such a system for processing data flows. A method for processing data flows comprises following steps: a step of performing a classification (60, 62) of data channels into a first and a second class of data channels; a step of processing of the first class data channels; a step of calculating information for the second class data channels from processing results of the step of processing; and a step of processing of the second class data channels using information calculated in the step of calculating information.

20 Claims, 7 Drawing Sheets

(56) References Cited

U.S. PATENT DOCUMENTS

| | | |
|---|---|---|
| 2002/0131532 A1* | 9/2002 | Chi et al. .................. 375/341 |
| 2003/0069017 A1* | 4/2003 | Ahmed et al. ............. 455/434 |
| 2003/0091003 A1 | 5/2003 | Wang et al. |
| 2004/0091067 A1* | 5/2004 | Ammer et al. ............. 375/341 |
| 2006/0083204 A1 | 4/2006 | Belaiche |
| 2007/0248270 A1 | 10/2007 | Hu et al. |
| 2009/0287984 A1* | 11/2009 | Sipila ......................... 714/794 |

* cited by examiner

PROCESSING DATA FLOWS

FIELD OF THE INVENTION

This invention in general relates to a system for processing data flows. Further, this invention in general relates to a method for processing data flows.

BACKGROUND OF THE INVENTION

Within an UMTS (Universal Mobile Telecommunications System) system the service combination and data rate selection format used to combine transport channels into a physical data stream coded composite transport channel is called transport format combination. For adaptation of occupied transmission resources to rapidly changing service requirements, the transport format combination (TFC) used by one transmitter may change rapidly. For decoding data (overhead and payload) at the receiver, the receiver must know the actually used channel format. Therefore, a transport format combination indicator (TFCI) may be attached to each frame of data to indicate which TFC has been selected. The receiver uses the TFCI to select the format for a decoding and separation of data into the different services.

For saving the bandwidth required for the TFCI, a Blind Transport Format Detection (BTFD) method has been suggested. This is a scheme for detecting (e.g. at the receiver side) the format of the transport channels. In case a data block is terminated by an error detection code, e.g. a CRC (Cyclic Redundancy Check) code, a test is performed to check whether a given sequence of bits in a data stream could be a CRC code for a block of data bits preceding the CRC bits. BTFD may make use of this fact. One concept of BTFD supposes the existence of following five types of transport channels: dual transport channels, explicit transport channels, DTF transport channels, guiding transport channels, and guided transport channels.

SUMMARY OF THE INVENTION

The present invention provides a system and a method for processing data flows as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
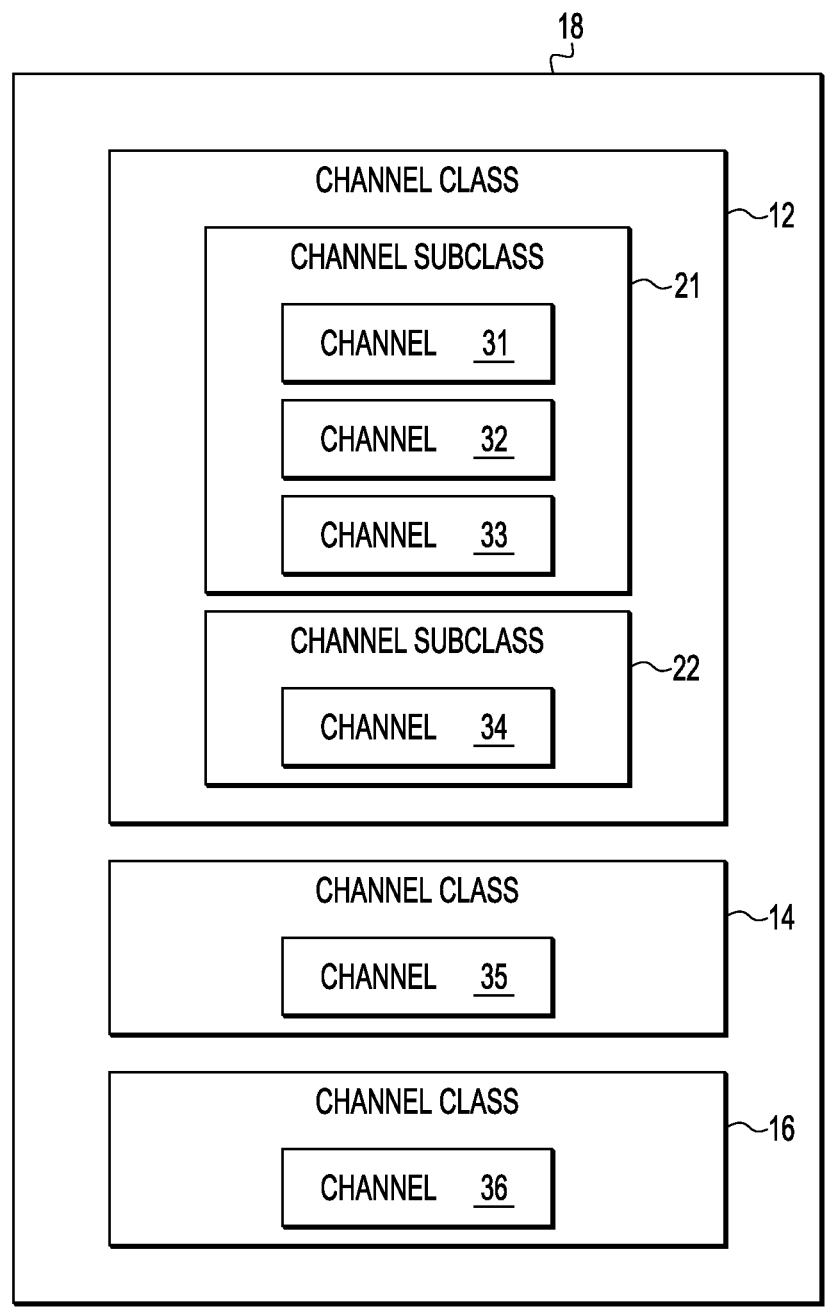
FIG. 1 shows schematically an example of a structure of classes of channels to be processed.

FIG. 1 shows schematically an example of a structure 10 of classes 12, 14, 16 of channels to be processed. The outer frame represents the set 18 of all channel classes to be considered for blind transport format detection. The set contains following three (main) classes of channels.

The first class 12 comprises channels 31, 32, 33, 34 that are to be processed independently. These types of channels 31, 32, 33, 34 do not need additional information in order to be processed. The first class 12 contains two sub-classes 21, 22 of channels. The first sub-class 21 contains channels 31, 32, 33 that after processing would not provide information for processing of other channels. In 3GPP BTFD (3rd Generation Partnership Project BTFD) such channels are explicitly detectable transport channels 31, dual transport format (DTF) transport channels 32, single transport format (STF) transport channels 33, and guiding transport channels 34. The explicitly detectable transport channels 31, which are not guiding channels, are channels whose transport format (TF) is detected by using explicit blind detection, as defined in TS 25.212. The dual transport format (DTF) transport channels 32 are channels whose transport format set contains exactly two transport formats, wherein the possible data rates are zero and full rate. The single transport format (STF) channels have a dual transport format; wherein the transport format set of the channels contains zero or one transport format with more than zero transport blocks, wherein the channels do not use guided detection.

The second class 14 contains channels 35 that need additional information 39 (see FIGS. 2 to 4) in order to be processed. Such information 39 is provided after the processing 42 (see FIGS. 5 to 7) of at least one channel 34 of the second sub-class 22 of the first class 12. Within 3GPP BTFD such channels 35 are called "guided channels".

Further, a third to $k^{th}$ class 16 is provided for a higher degree of generalization. Within the third, fourth, etc. class 16 of channels 36, each channel 36 of a given class is processed using additional information forming a result from processing of at least one channel of a previous class of channels or from a combination of classes from the set of the previous k−1 classes.

Figure 2:
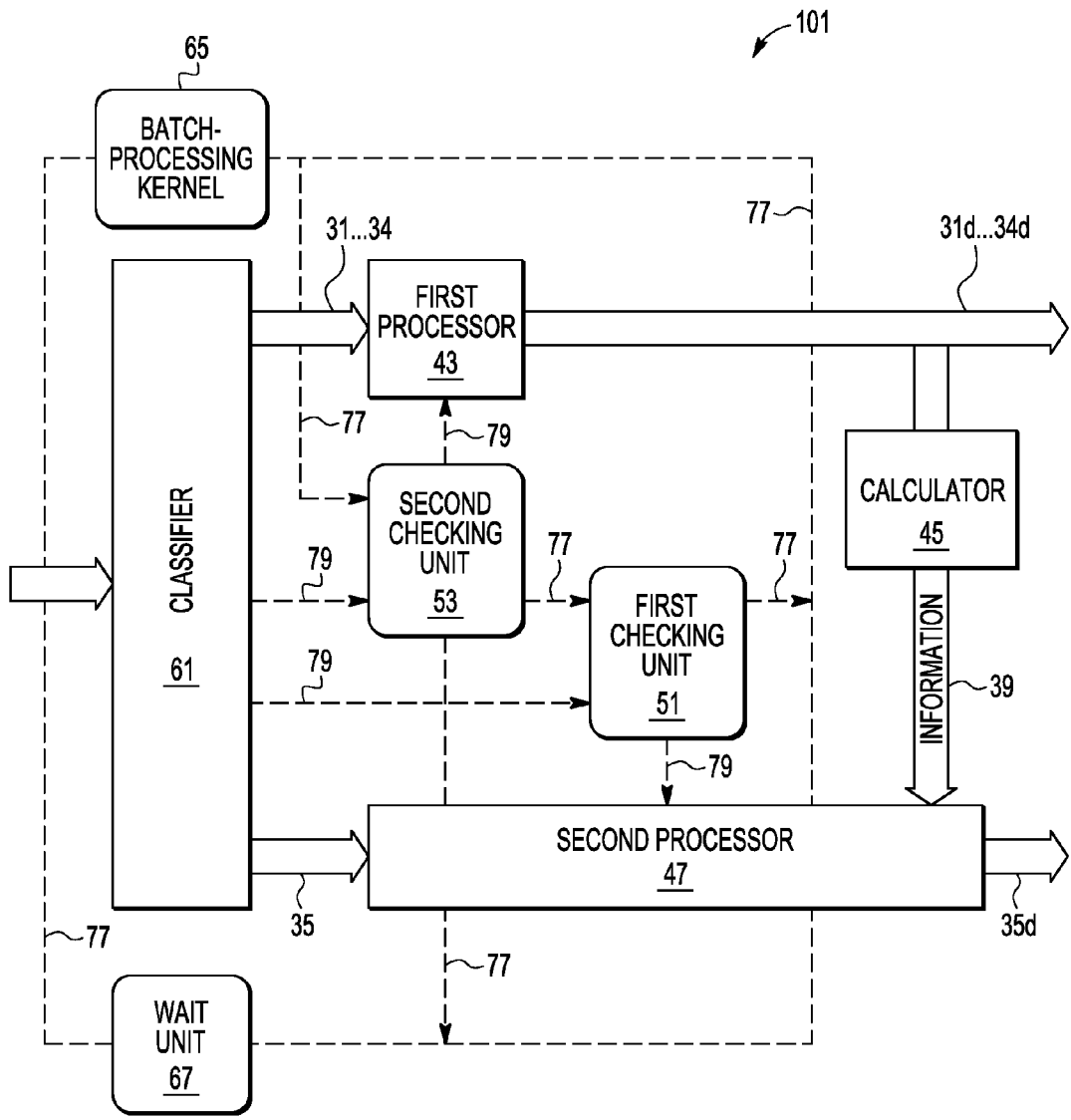
FIG. 2 shows schematically a block diagram of a first example embodiment of a system for format detection.

FIG. 2 shows schematically a block diagram of a first example embodiment of a system 101 for format detection. The system 101 for processing data flows comprises a classifier 61, a first 43 and second 47 processor, a first 51 and second 53 checking unit, and a calculator 45. The classifier 61 is designed for classifying 60 (see FIG. 5) of data channels 31, 32, 33, 34, 35 into a first 12 and a second 14 class of data channels. The first processor 43 is designed for processing of the first class data channels 31, 32, 33, 34. The first checking unit 51 is designed for checking 50 (see FIG. 5) whether there are any channels 34 of a second sub-class 22. The calculator 45 is designed for calculating 44 information 39 for the second class data channels 35 from processing results 34d of the first processor 43. The second processor 47 is designed for processing 46 (see FIGS. 5 to 7) the second class data channels 35 using information 39 calculated by the calculator 45. The system 101 has a second checking unit 53 for checking 52 (see FIG. 5) whether there are any data channels 31, 32, 33, 34 belonging to any of a first 21 and second 22 sub-class of data channels. Possible checking results include a set of decoded channels 31d, a set of decoded channels 32d, a set of decoded channels 33d, a set of decoded channels having as well channels of type 34d as of 35d. The respective set may be a set having only one channel. The postfix d of channels 31d to 35d indicates the decoded form of the respective channel 31d to 35d. A possible mode of action of the system 101 is explained in more detail in the description of FIG. 5. The arrows in the figures having dotted lines represent control paths. A first category of control paths 77 are designed to confer signalling for driving the system 101. A second category of control paths 79 form interfaces for transmitting channel designators.

Figure 3:
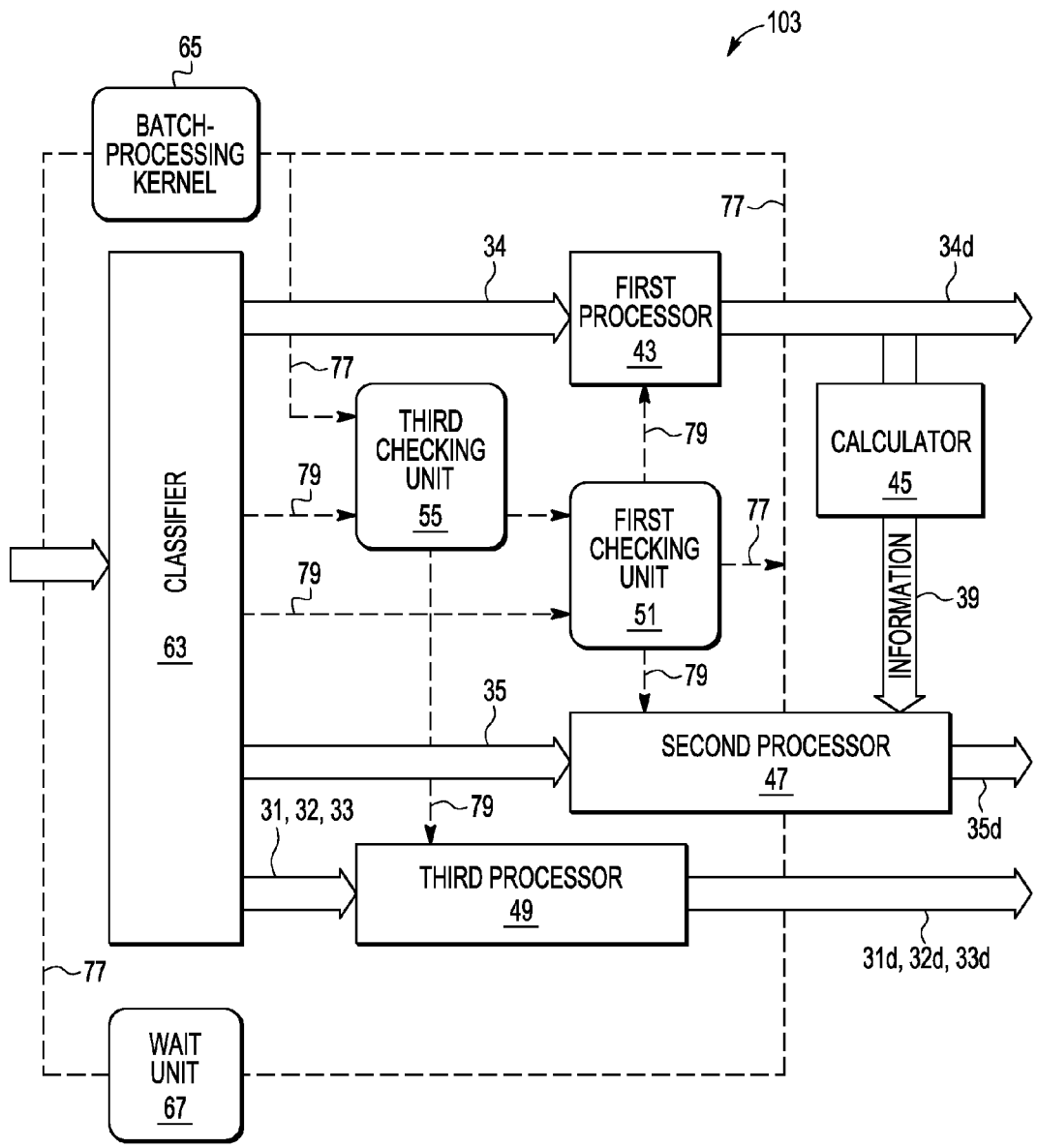
FIG. 3 shows schematically a block diagram of a second example embodiment of a system for format detection.

FIG. 3 shows schematically a block diagram of a second example embodiment of a system 103 for format detection. The system 103 for processing data flows comprises a classifier 63, a first 51 and a third checking unit 55, a calculator 45, a first 43, second 47, and third processor 49. The classifier 63 is designed for classifying 62 (see FIG. 6) of data channels 31, 32, 33, 34, 35 into first 31, 32, 33 and second 34 sub-class channels, and second class data channels 35. The first processor 43 is designed for processing the second sub-class data channels 34. The second processor 47 is designed for processing the second class data channels 35. The third processor 49 is designed for processing the first sub-class data channels 31, 32, 33. The first checking unit 51 is designed for checking 50 whether there are any channels 34 of the second sub-class 22. The calculator 45 is designed for calculating 44 information 39 for the second class data channels 35 from processing results 34d of the first processor 43. The second processor 47 is designed for processing 46 (see FIG. 6) the second class data channels 35 using information 39 calculated by the calculator 45. The system 103 further comprises a third checking unit 55 and a third processor 49. The third checking unit 55 is designed for checking 54 whether there are any data channels 31, 32, 33 belonging to the first sub-class 21 of data channels. The third processor 49 is designed for processing the first sub-class data channels 31, 32, 33. Possible checking results include a set of decoded channels 31d, a set of decoded channels 32d, a set of decoded channels 33d, a set of decoded channels having as well channels of type 34d as of 35d. The respective set may be a set having only one channel. A first category of control paths 77 are designed to confer signalling for driving the system 102. A second category of control paths 79 form interfaces for transmitting channel designators. A possible mode of action of the system 103 is explained in more detail in the description of FIG. 6.

Figure 4:
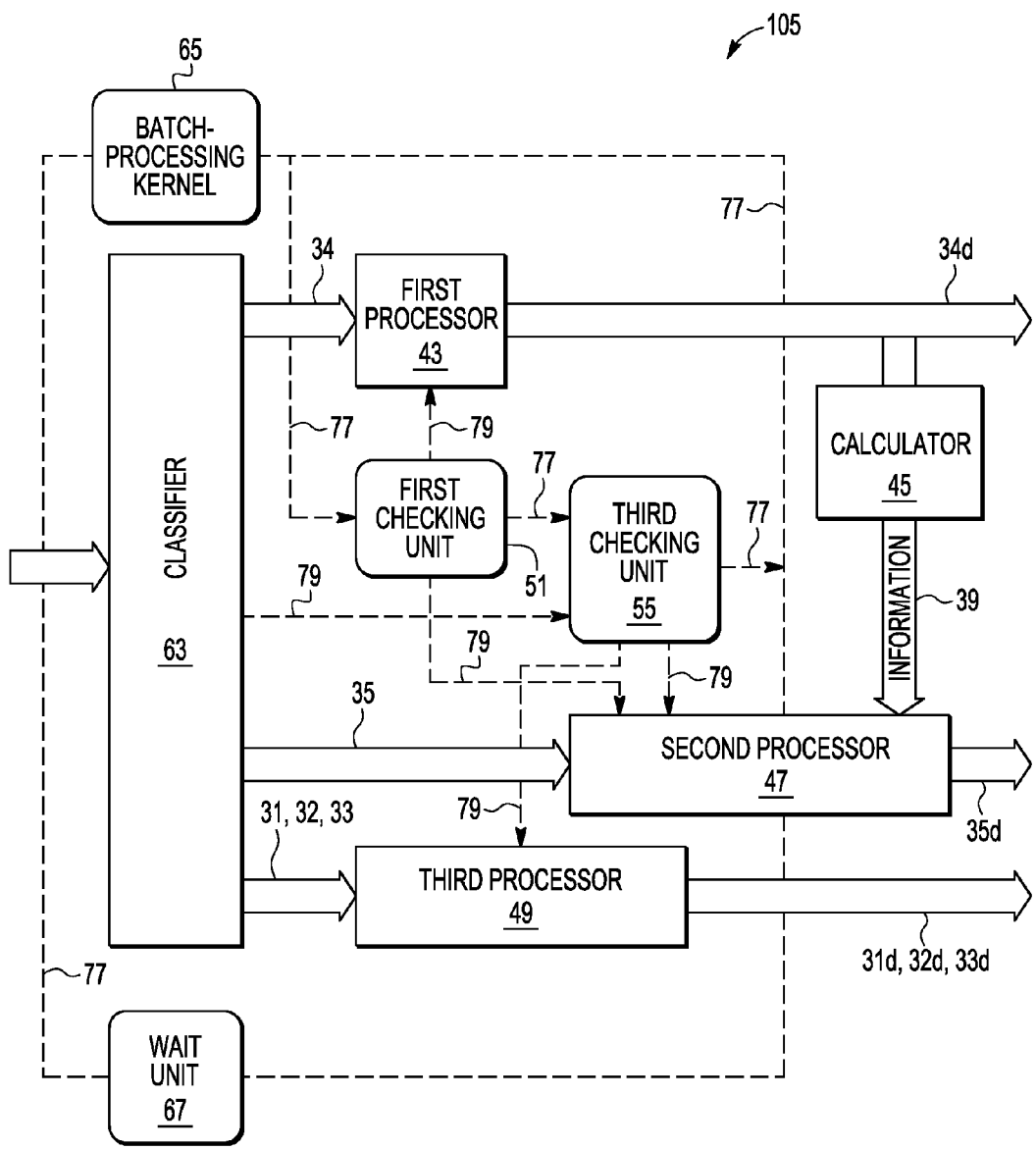
FIG. 4 shows schematically a block diagram of a third example embodiment of a system for format detection.

FIG. 4 shows schematically a block diagram of a third example embodiment of a system 105 for format detection. The system 105 for processing data flows comprises a classifier 63, a first 43 and second 47 processor, a first 51 and third 55 checking unit, a calculator 45, and a third processor 49. The classifier 63 is designed for classifying 62 (see FIG. 7) of data channels 31, 32, 33, 34, 35 into a first 31, 32, 33 and second 34 sub-class channels, and a second class 14 of data channels 35. The first processor 43 is designed for processing 42 of the second sub-class data channels 34. The first checking unit 51 is designed for checking 50 whether there are any channels 34 of the second sub-class 22. The calculator 45 is designed for calculating 44 information 39 for the second class data channels 35 from processing 46 results 34d of the first processor 43. The second processor 47 is designed for processing the second class data channels 35 using information 39 calculated by the calculator 45. The third checking unit 55 is designed for checking 54a, 54b whether there are any data channels 31, 32, 33 belonging to the first sub-class 21 of data channels. Possible checking results include a set of decoded channels 31d, a set of decoded channels 32d, a set of decoded channels 33d, a set of decoded channels having as well channels of type 34d as of 35d. The respective set may be a set having only one channel. The third processor 49 is designed for processing the first sub-class data channels 31, 32, 33. A first category of control paths 77 are designed to confer signalling for driving the system 103. A second category of control paths 79 form interfaces for transmitting channel designators. A possible mode of action of the system 103 is explained in more detail in the description of FIG. 7.

Each of the systems 101, 103, 105 has a controlling unit 65 for controlling the components and the processing within the respective system 101, 103, 105. Further, each of the systems 101, 103, 105 has a wait unit 67 for waiting 66 for next channel data. Each of the systems 101, 103, 105 can form a part of network equipment for an uplink connection, or a part of user equipment for a downlink connection or batch processing of format detection.

Figure 5:
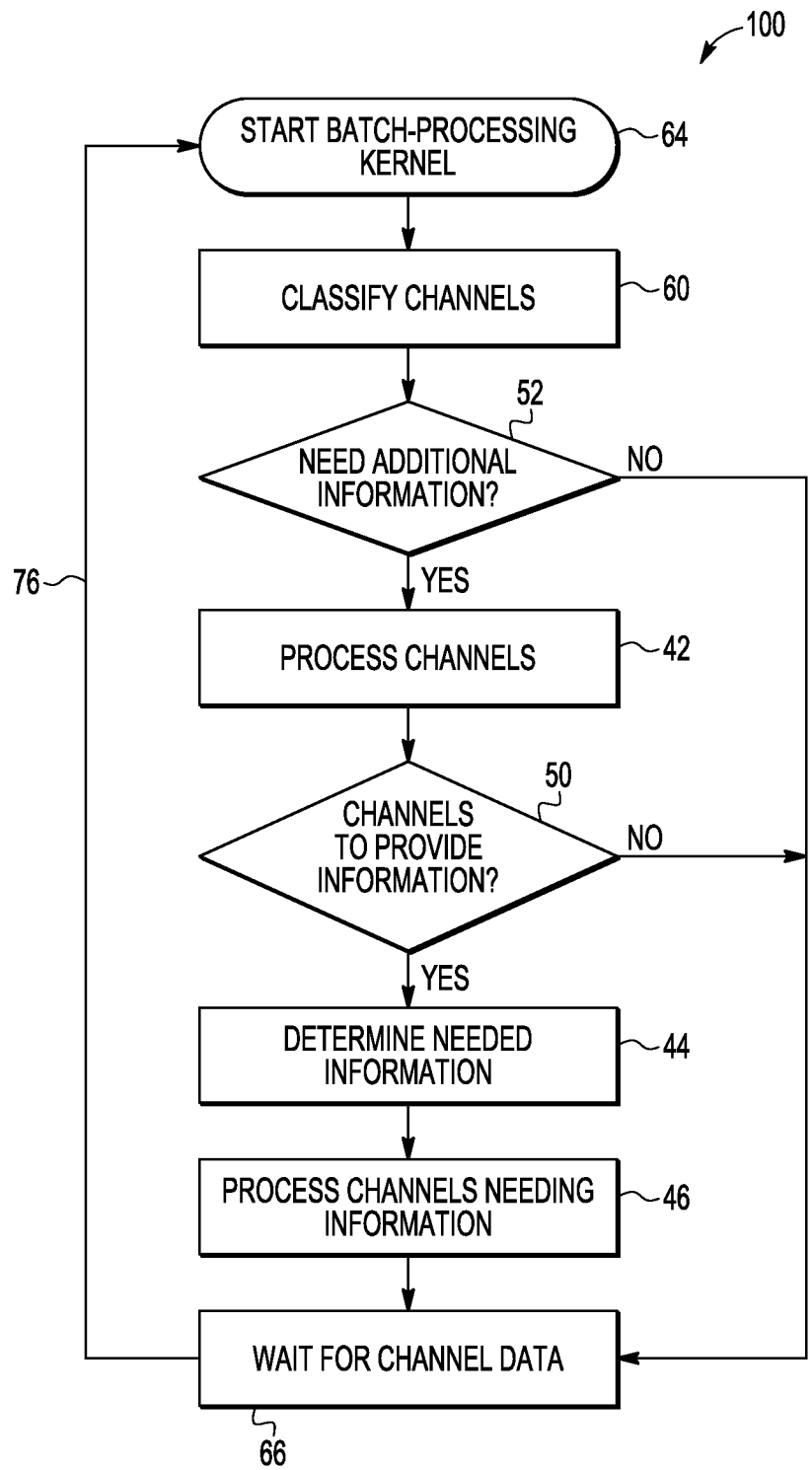
FIG. 5 shows schematically a flow diagram of a first example embodiment of a method for format detection.

FIG. 5 shows schematically a flow diagram of a first example embodiment of a method 100 for format detection. In a first step 64 a format detection processor 101 is initialized and started by starting a batch processing kernel 65. In a second step a channel classification 60 takes place. After the channel classification 60, a check 52 is performed whether there are any channels 31, 32, 33, 34 which do not need additional information 39 in order to be processed. If there were no such channels 31, 32, 33, 34 the batch process starts waiting 66 for next channel data. At a second step 42, those channels 31, 32, 33, 34 are processed which do not need additional information 39 in order to be processed, if there were any. At a third step, a check 50 is performed whether there are any channels 34 that provide information 39 to aid in the processing 46 of other channels 35. If there were no such channels 34 the batch process starts waiting 66 for next channel data. Otherwise information 39 for channels 35 that need additional information 39 is calculated based on results 34d of the processing 42 of channels 34 that provide information 39 to aid in the processing 46 of other channels 35 (step 44). At fourth, the channels 35 that need additional information 39 in order to be processed are processed (step 46). With 3GPP BTFD the channels 35 that need additional information 39 in order to be processed are called guided transport channels 35. Then, the batch process starts or resumes waiting 66 for next channel data.

Figure 6:
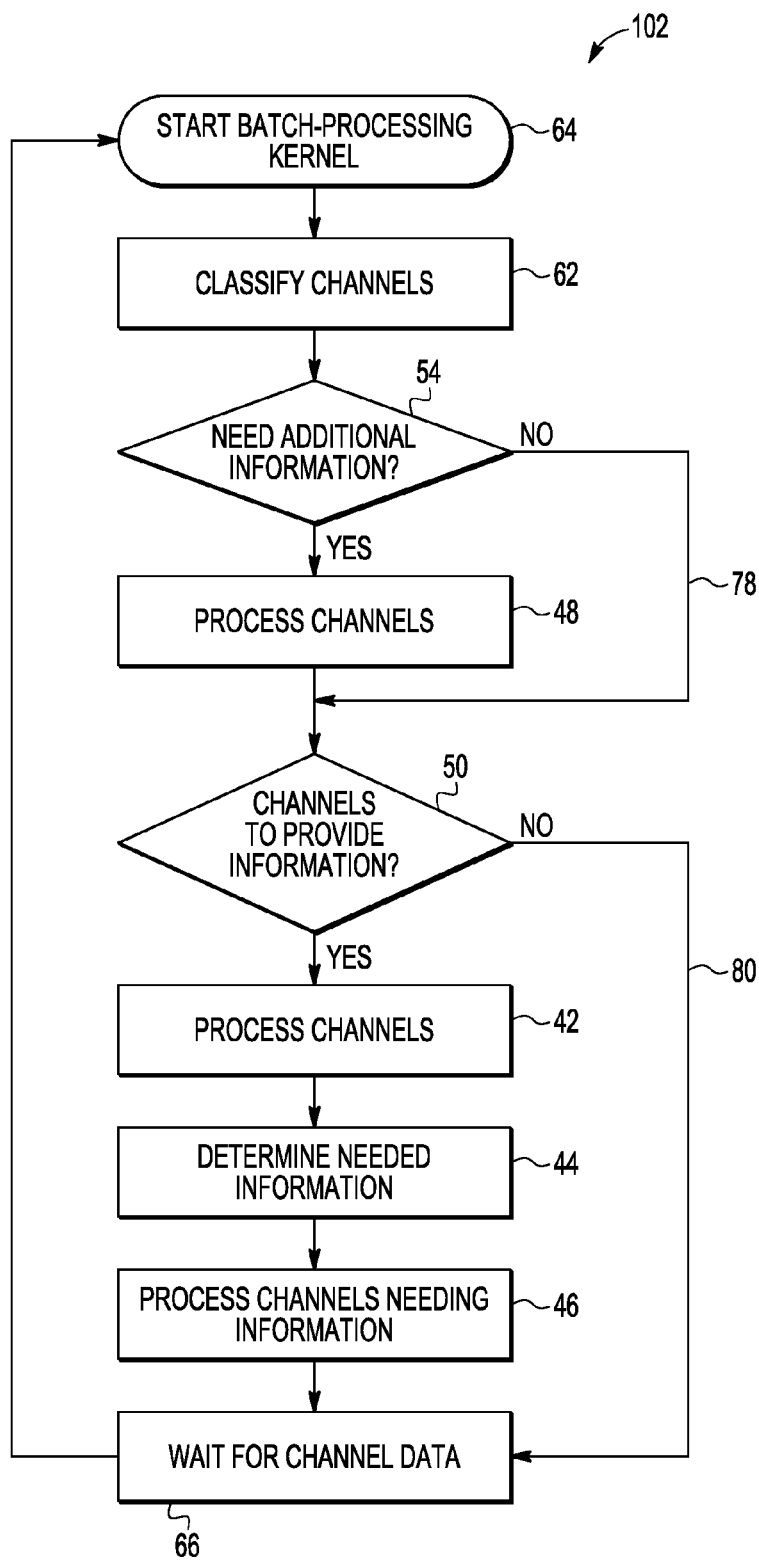
FIG. 6 shows schematically a flow diagram of a second example embodiment of a method for format detection.

FIG. 6 shows schematically a flow diagram of a second example embodiment of a method 102 for format detection. At first, the format detection processor 103 is initialized and started e.g. by starting a batch processing kernel 65 (step 64). Then, a channel classification 62 takes place. After the channel classification 62, a check 54 is performed whether there are any channels 31, 32, 33 which neither provide information 39 for processing other channels nor need additional information 39 to be processed. Such channels 31, 32, 33 are to be processed independently (step 48). If there were no channels 31, 32, 33 that neither provide information 39 for processing other channels nor need additional information 39 to be processed, the batch process continues with a check 50 (see transition 78). At third, a check 50 is performed whether there are any channels 34 that provide information 39 to aid in the processing 46 of other channels 35. If there were no such channels 34 the batch process starts waiting 66 for next channel data (see transition 80). Otherwise channels 34 that provide information 39 to aid in the processing 46 of other channels 35 are processed (step 42). At fourth, information 39 for channels 35 that need information 39 is calculated, based on channels 34 (step 44). At fifth, the channels 35 that need additional information 39 in order to be processed are processed (step 46). Then, the batch process starts or resumes waiting 66 for next channel data (step 66).

Figure 7:
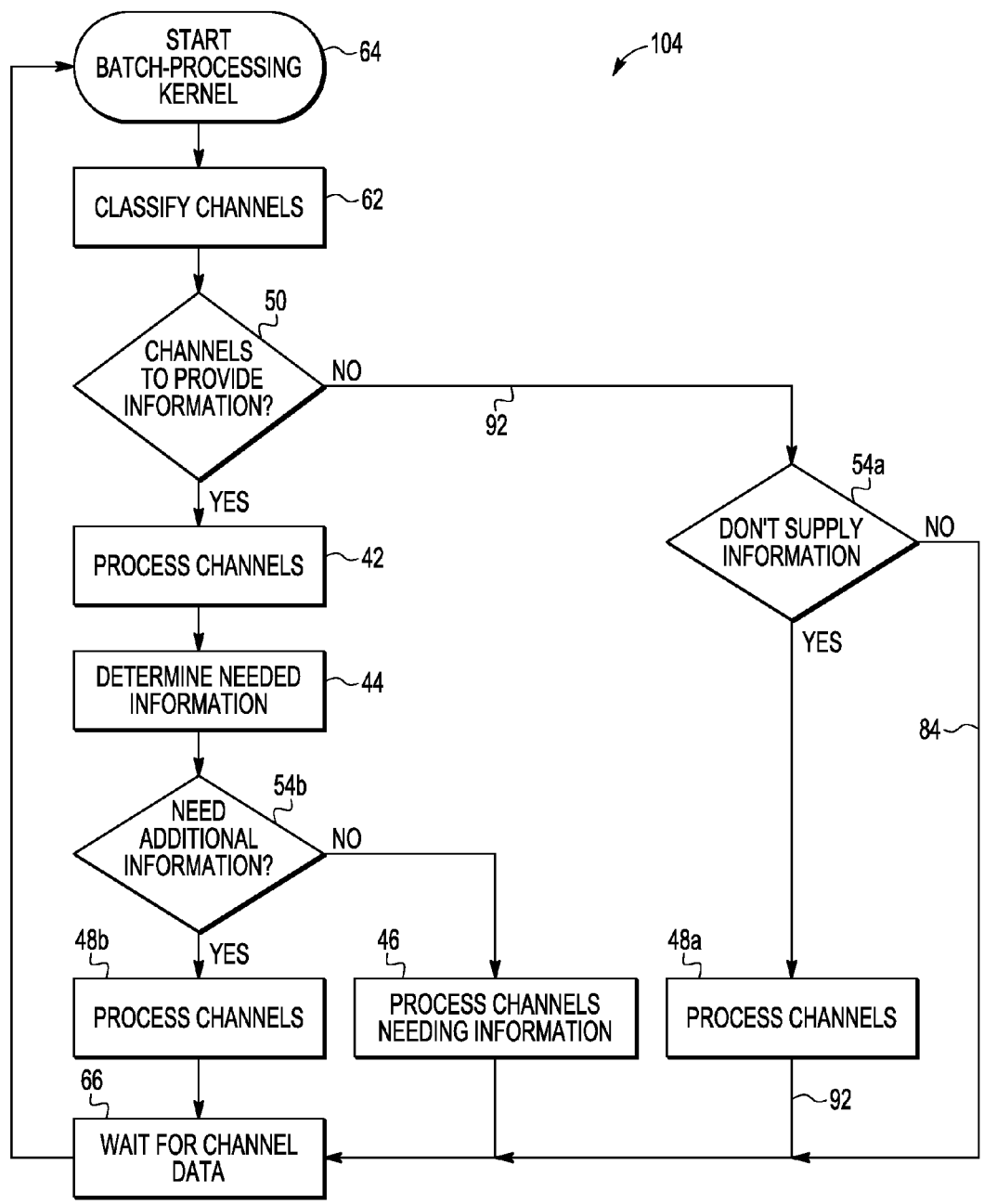
FIG. 7 shows schematically a flow diagram of a third example embodiment of a method for format detection.

FIG. 7 shows schematically a flow diagram of a third example embodiment of a method 104 for format detection. At first, the format detection processor 105 is initialized and started e.g. by starting a batch processing kernel 65 (step 64). Then, a channel classification 62 takes place. After the channel classification 62, a check 50 is performed whether there are any channels 34 which, after processing, will provide information 39 to aid in the processing 46 other channels 35. If there were no channels 34 which, after processing 42, would provide information 39 to aid in the processing 46 other channels 35, a check 54a is performed whether there are any channels 31, 32, 33 which neither need additional information 39 in order to be processed 46 nor after processing 42 would provide information 39 for processing 46 of other channels 35 (see transition 92). If there were such channels 31, 32, 33, these channels 31, 32, 33 are processed (step 48a); and afterwards the process starts or resumes waiting 66 for next channel data. If there were any channels 34 which, after processing 42, would provide information 39 to aid in the processing 46 other channels 35, the (guiding) channels 34 are processed 42. If there were no such channels 34 the batch process starts waiting 66 for next channel data (transition 84). The information 39 for channels 35 that need additional information 39 is calculated 44 based on results 34d of the processing 42 of channels 34 that provide information 39 to aid in the processing 46 of other channels 35. Then, a check 54b is performed whether there are any channels 31, 32, 33 which neither need additional information 39 in order to be processed 46 nor after processing 42 would provide information 39 for processing 46 of any other channel 35. If there were any of such channels 31, 32, 33, these types of channels 31, 32, 33 as well as those channels 35 are processed (step 48b). If there were no channels 31, 32, 33 which neither need additional information 39 in order to be processed 46, nor, after processing 42, provide information 39 for processing 46 of any other channel 35, only those channels 35 are processed, which need additional information 39 in order to be processed (step 46). In any case, afterwards, the process starts or resumes waiting for next channel data (step 66).

A general system 101, 103, 105 and method 100, 102, 104 of processing, in particular batch processing, or decoding of a flow of a group of dependent data channels 31, 32, 33, 34, 35 (dependent data flows) has been provided. In particular, a system 101, 103, 105 and method 100, 102, 104 for processing or decoding of a set of transport channels 31, 32, 33, 34, 35 in a blind transport format detection (BTFD) mode, in particular for 3GPP Release 99 FDD specifications (TS 25.212) has been specified.

Each of the processing data flows 100, 102, 104 minimizes the processing overhead compared to processing each channel 31, 32, 33, 34, 35 in sequence. The classification 60, 62 of the channels 31, 32, 33, 34, 35 and the channel processing flows 100, 102, 104 reduces number of iterations required. The system performance and resource utilization is maximized. Without this invention, the channel-by-channel method requires in a 3GPP system up to eight processing steps, depending on the configuration, including hardware/software overhead of managing the processes. Eight is the number of simultaneous transport channels for 384 kbit/s class, for uplink and downlink, as specified in 3GPP TS 25.306. Each of the processing embodiments of the processing data flow minimizes the processing overhead compared to processing each channel in sequence. Each of the embodiments 100, 102, 104 of processing data flows can be used on different platforms, depending on the hardware support, or alternatively on the same platform. Here, the term "different platforms" refers to at least one of the terms "different hardware platforms", "different software platforms", and "different system platforms". The switching between the processing data flows can be done statically, semi-statically, or dynamically. These points allow maximizing the system performance and resource utilization, in particular for a decoding of 3GPP transport channels in the BTFD mode (Blind Transport Format Detection).

Without limitation, the invention is targeting systems that require processing of channels 31, 32, 33, 34, 35 that can be classified/described according to their characteristics. It is desirable to perform the proposed processing steps on a group of channels 31, 32, 33, 34, 35 in one shot (or even simultaneously). Such a "batch" processing is performed at any time there is data on channels 31, 32, 33, 34, 35 to be processed. In the case of a 3GPP system, this can be on a periodic basis (each 10, 20, 40 or 80 ms). In the case of a 3GPP system, it will be done in an active session and applies to voice, packet, or circuit switched data. In particular, the method is applicable for a fast download and for presentations of web pages. In this context, the term "batch" is used to describe the processing in a single step of multiple channels of the same type. Since these channels (like any communications channel) are processed on a periodic basis (10, 20, or 40 ms periods for 3G as an example), this batch processing occurs "live" during a connection on these periodic boundaries. This all occurs during an active session and applies to voice, packet, or circuit switched data in a 3G network. In other networks using blindly detectable channels 31, 32, 33, 34, 35, this can be done either live or as a post-processing step offline.

The invention claimed is:

1. A system for processing data flows, the system comprising:
    a classifier for classifying of data channels into a first and a second class of data channels, wherein first class data channels are data channels that do not need information from other data channels in order to be processed, including a first sub-class of data channels that after processing do not provide information for processing of other channels and a second subclass of data channels that after processing do provide information for processing of other channels; and wherein second class data channels need information from at least one of the first class data channels in order to be processed;
    a first processor for processing of second sub-class data channels of the first class data channels;
    a first checking unit for checking whether there are any data channels of the second sub-class;
    a calculator for calculating information for the second class data channels from processing results of the first processor; and
    a second processor for processing the second class data channels using information calculated by the calculator.

2. The system according to claim 1, the system having a second checking unit for checking whether there are any data channels belonging to any of the first sub-class of data channels.

3. The system according to claim 1, the system having a classifier for classifying the data channels into the first and the second sub-class, and the second class of data channels; and wherein the system further comprises the following components:
    a third checking unit for checking whether there are any data channels belonging to the
    first sub-class of data channels; and
    a third processor for processing the first sub-class data channels.

4. At least one of network equipment for an uplink connection, user equipment for a downlink connection or batch processing of format detection, the equipment comprising a system according to claim 1.

5. A method for processing data flows, the method comprising:
 a first step of performing a classification of data channels into a first and a second class of data channels, wherein first class data channels are data channels that do not need information from other channels in order to be processed, including a first sub-class of data channels that after processing do not provide information for processing of other channels and a second sub-class of data channels that after processing do provide information for processing of other channels; and wherein second class data channels need information from at least one of the first class data channels in order to be processed;
 a third step of processing of the first class data channels;
 a fourth step of checking whether there are any channels of a second sub-class providing information for processing second class data channels;
 a fifth step of calculating information for the second class data channels from processing results of the third step of processing; and
 a sixth step of processing of the second class data channels using information calculated in the fifth step, wherein the processing the data flows comprises processing multiple data channels of a class in a single step.

6. The method according to claim 5, the method having between the first and the third step a second step of checking whether there are any data channels belonging to the first class of data channels.

7. The method according to claim 5, wherein the data channels are classified into the first and second sub-class, and the second class of data channels while performing the step of classification; and wherein the method further comprises following steps:
 a seventh step of checking whether there are any data channels belonging to the first sub-class of data channels; and
 an eighth step of processing of the first sub-class data channels.

8. The method according to claim 7, wherein the sixth step is performed after the seventh step.

9. The method according to claim 7, wherein the third step is performed after the fourth step.

10. The method according to claim 5, wherein at least one of the data channels of the first class of data channels is a guiding transport channel or wherein at least one of the data channels of the second class of data channels is a guided transport channel.

11. The method according to claim 5, wherein at least one of the data channels of the first sub-class of data channels is an explicitly detectable transport channel.

12. The method according to claim 5, wherein at least one of the data channels of the first sub-class of data channels is a dual transport format transport channel.

13. The method according to claim 5, wherein:
 the first step further comprises classifying some of the data channels into classes higher than second class; and
 each data channel of the higher than second class is processed using additional information forming a result from processing of a data channel of at least one of the data channels of at least one of the lower classes of data channels.

14. The method according to claim 5, wherein the method is used in a communication system, in particular for blind transport format detection, in particular wherein a data channel is a coded composite transport channel.

15. The method according to claim 5, wherein the processing multiple data channels of the class in a single step comprises processing the multiple data channels of the class simultaneously.

16. The method according to claim 15, wherein the multiple data channels comprise simultaneous transport channels.

17. A system for processing data flows, the system comprising:
 a classifier for classifying of data channels into a first and a second class of data channels, wherein:
  first class data channels are data channels that do not need information from other data channels in order to be processed, including a first sub-class of data channels that after processing do not provide information for processing of other channels and a second sub-class of data channels that after processing do provide information for processing of other channels; and
  second class data channels need information from at least one of the first class data channels in order to be processed;
 a checking unit for checking whether there are any channels of the second sub-class;
 one or more processors for processing the first class and second class data channels, wherein the processing comprises processing multiple data channels of a class in a single step; and
 a calculator for calculating information for the second class data channels from processing results of the first class data channels, wherein the processing the second class data channels uses information calculated by the calculator.

18. The system according to claim 17, the system having another checking unit for checking whether there are any data channels belonging to any of the first sub-class of data channels.

19. The system according to claim 17, wherein the processing comprises processing the first sub-class of data channels before the second sub-class of data channels and before the second class of data channels.

20. The system according to claim 17, wherein the processing comprises processing the second sub-class of data channels before the first sub-class of data channels and before the second class of data channels.

* * * * *